United States Patent [19]

Farr

[11] Patent Number: 4,707,036

[45] Date of Patent: Nov. 17, 1987

[54] BRAKE PRESSURE REDUCING VALVE

[75] Inventor: Glyn P. R. Farr, Leek Wooton, England

[73] Assignee: Lucas Industries Public Limited Company, Birmingham, England

[21] Appl. No.: 888,121

[22] Filed: Jul. 22, 1986

[30] Foreign Application Priority Data

Jul. 24, 1985 [GB] United Kingdom ................ 8518706

[51] Int. Cl.⁴ .......................... B60T 8/18; B60T 13/00
[52] U.S. Cl. .................................... 303/6 C; 188/195; 188/349; 303/22 R
[58] Field of Search .................. 303/22 R, 22 A, 6 C, 303/6 R, 24, 23; 188/195, 349, 2 A

[56] References Cited

U.S. PATENT DOCUMENTS

| 3,362,758 | 1/1968 | Goerke et al. | 303/22 R |
| 3,488,095 | 1/1970 | Rath | 303/22 R X |
| 4,040,674 | 8/1977 | Marcilland | 303/22 R |
| 4,060,283 | 11/1977 | Demido et al. | 303/22 R X |
| 4,209,200 | 6/1980 | Hales | 303/22 R |
| 4,448,457 | 5/1984 | Pressaco | 303/22 R |

FOREIGN PATENT DOCUMENTS

WO85/02589  6/1985  PCT Int'l Appl. ................ 303/6 C
2099528 12/1982 United Kingdom ................ 188/195

Primary Examiner—Douglas C. Butler
Attorney, Agent, or Firm—Scrivener and Clarke

[57]  ABSTRACT

A load conscious brake pressure reducing valve assembly comprises a piston (2A) mounted on a piston rod (2) and movable to control a valve (6) for controlling the connection between an inlet (4) and outlet (3). The valve body (1) is mounted on a sprung part (7) of a vehicle and the piston rod (2) is coupled to an unsprung part (9) by a position sensing lever (10) and springs (32,20) nominal separation of the sprung and unsprung parts the sensing device (8) exerts no force on the piston rod. For greater spacings of the sprung and unsprung parts the spring (20) exert a force on the piston rod which opposes the force of an internal spring (5), and for lesser spacings the spring (32) exert a force on the piston rod which enhances the force of the internal spring. As a result the net spring force acting on the piston always decreases as the separation of the sprung and unsprung parts increases.

9 Claims, 6 Drawing Figures

- IDEAL
- - - ACTUAL
F.L. FULLY LADEN
D.O. DRIVER ONLY

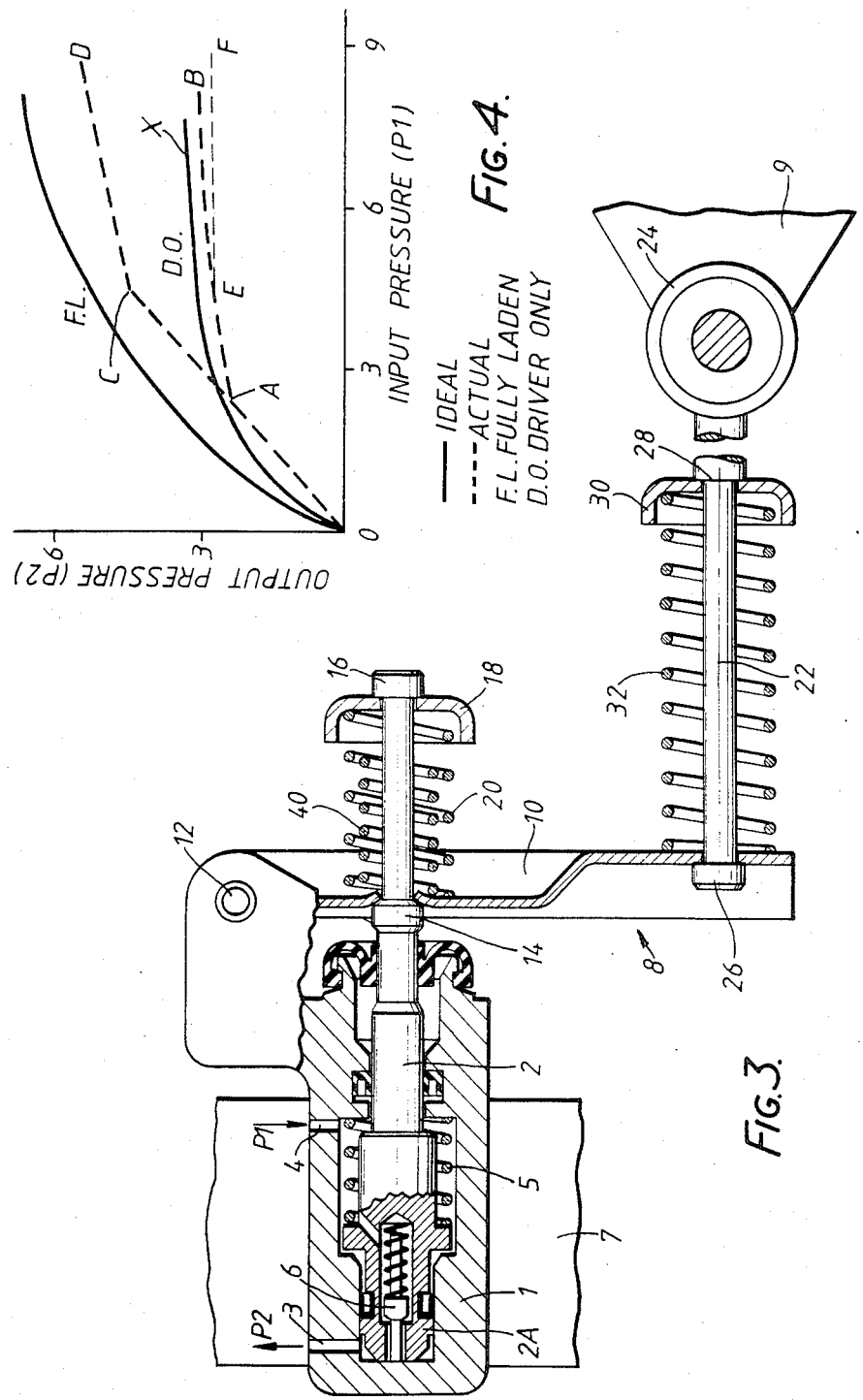

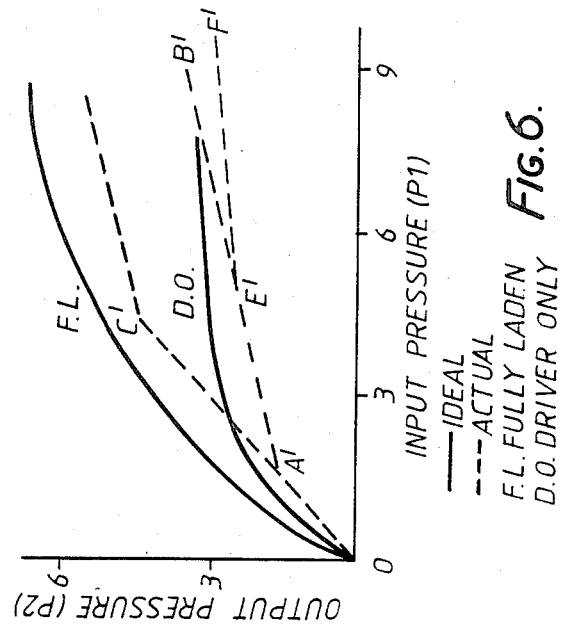
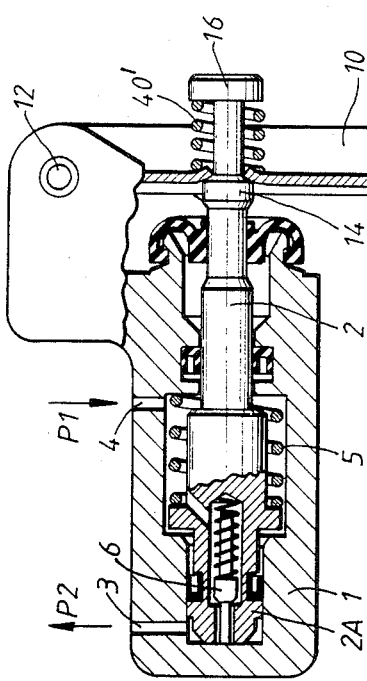
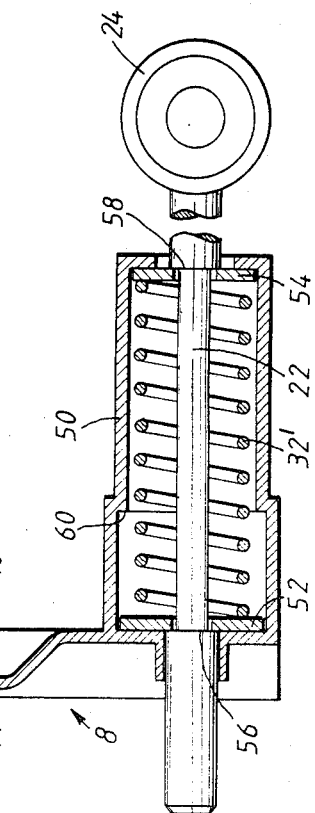
Fig. 6.
Fig. 5.

BRAKE PRESSURE REDUCING VALVE

This invention is concerned with a load conscious pressure reducing valve assembly for a vehicle braking system.

There are known in the art pressure reducing valves which are adapted to reduce the hydraulic braking pressure delivered to the rear brakes of a vehicle, compared with that being delivered to the front brakes, once a so-called cut-in pressure level has been reached. Some known valves are sensitive to vehicle deceleration and only operate to reduce the transmitted pressure when a given rate of deceleration is exceeded. Other known valves are "load conscious", i.e. they respond to changes in the loading condition of the vehicle, as determined by the relative positions of the sprung and unsprung parts of the vehicle, and adjust the cut-in pressure accordingly. A valve of the latter kind is shown in GB No. 1252700 and comprises a valve body, a piston received in the body and separating first and second space therein, inlet and outlet ports in the body connected to the first and second spaces, respectively, a piston rod attached to the piston and projecting through the first space and from the body, a spring acting on the piston and urging the piston towards the second space, a normally open valve in the piston arranged to close in response to displacement of the piston in the direction against the force of the spring, and a load sensing spring for exerting on the piston rod an inwardly directed force dependent upon the vehicle loading condition.

As explained in detail in our published patent application No. GB No. 2150994A, the prior art valve as just described produces an outlet pressure v. inlet pressure characteristic which approximates to the ideal curve, for static conditions. However, under dynamic conditions, in particular due to transfer of weight from the rear wheels to the front wheels during braking, which the pressure reducing valve sees as a reduction in vehicle loading and responds accordingly, the pressure delivered to the rear brakes can depart significantly from the optimum. If the vehicle is fully laden it is even possible for the pressure transmitted to the rear brakes to decrease as the pressure delivered to the front brakes is increasing, after the cut-in pressure has been reached.

As a solution to the problem the aforementioned published application teaches a valve in which the internal spring is arranged to urge the piston in its valve closing direction, and the load sensing spring is preloaded so that, for all loading conditions of the vehicle, it exerts on the piston rod a force opposing that of the internal spring. By suitable choice of the relative areas of the piston and piston rod, it is then ensured that the outlet pressure will always increase with a rising inlet pressure and the outlet pressure v. inlet pressure characteristic is a good approximation to the ideal curves under dynamic braking conditions. The valve operates satisfactorily in use, but it does have certain drawbacks. Firstly, the load sensing spring must be prestressed to such an extent that it can have an undesirable influence on the vehicle suspension. Secondly it is difficult to accommodate the movements of the vehicle suspension without over-stressing the load sensing spring.

The present invention seeks to provide a load conscious pressure reducing valve which overcomes the draw-backs of the previously proposed valve but which also avoids the problems of the prior art valve mentioned above. With this aim in mind the invention resides in a load conscious pressure reducing valve assembly comprising a valve body having an inlet and an outlet, a piston movable in the body from a normally open position in which the inlet and outlet are in communication to a closed position in which said communication is interrupted, a piston rod attached to the piston and protruding from the body, a spring acting on the piston and urging it towards said open position, and load sensing means for sensing the relative positions of sprung and unsprung vehicle parts and so applying a force to the piston rod dependent upon the sensed position that, during braking the sum of the forces exerted on the piston by the spring and the load sensing means and urging the piston towards the open position will reduce the response to an increase in distance separating the sprung and unsprung vehicle parts irrespective of the initial magnitude of said force sum.

Stated more precisely, for a separation between the sprung and unsprung parts corresponding to a nominal loading e.g. the driver only condition, the load sensing means does not exert any force on the piston rod. In the case of a reduced separation, corresponding to greater vehicle loading, the load sensing means applies a force enhancing that due to the spring, but in the case of a greater separation, implying a vehicle loading less than the nominal loading, the load sensing means will apply to the piston a force opposing that of the spring.

With such an assembly embodying the invention the position sensing means does not exert a substantial preloaded spring force on the piston rod and any such preload will be relatively light. At the same time, whatever the actual loading, weight transfer during vehicle braking will result in a reduced force on the piston biasing it to the open position whereby the pressure characteristics will follow closely the ideal curves.

A better understanding of the invention will be had from the following description of some embodiments, reference being made to the accompanying drawings, wherein FIG. 1 is a schematic repesentation of a prior art load conscious pressure reducing valve;

FIG. 3 is a sectional view illustrating a valve assembly in accordance with the invention;

FIG. 4 is a graph similar to FIG. 2 and showing the characteristics of the valve assembly of FIG. 3;

FIG. 5 is a sectional view of another embodiment of the invention; and

FIG. 6 is a graph illustrating the characteristics of the FIG. 5 embodiment.

Figure 1:
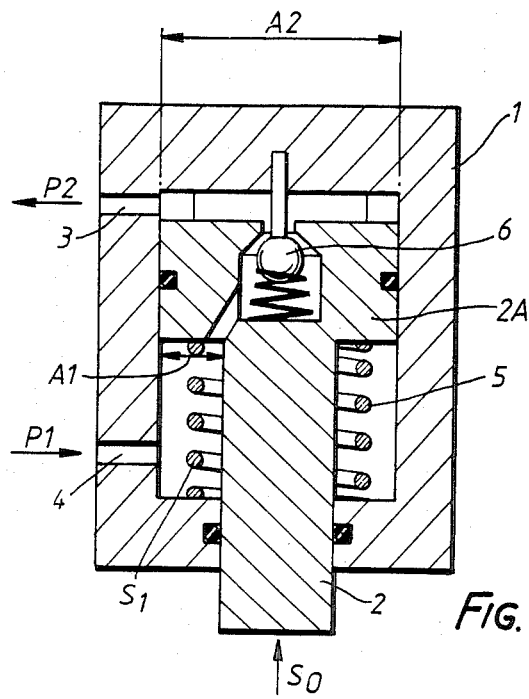
Figure 2:
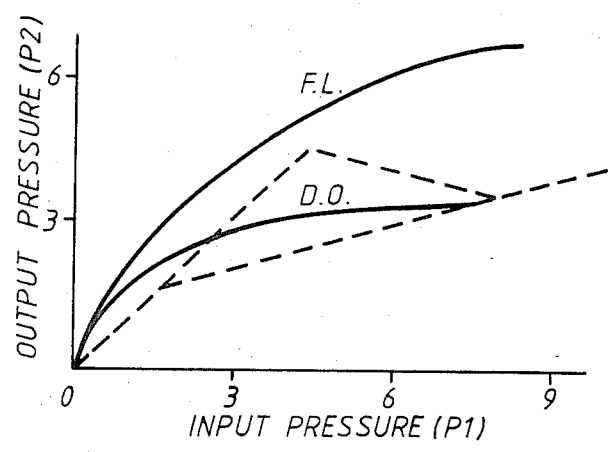
FIG. 2 is a graph of output pressure plotted against input pressure and comparing the characteristics of the FIG. 1 valve (broken line) with the ideal curves (full line)

FIGS. 1 and 2 correspond to those figures of the same number in published application GB 2150994 A and reference is made to that specification for an explanation of the valve operation and why the particular characteristics are produced. The construction of the valve will be described briefly. It comprises a valve body 1, a piston 2A received in the body and attached to a piston rod 2 protruding through an end wall of the body, an outlet port 3 and an inlet port 4 opening into spaces on either side of the piston, an opening through the piston for communicating said spaces, and a valve 6 for closing the opening when the piston is displaced in a closing direction against a force applied to the piston by a spring 5. It will be appreciated that the valve will close to interrupt direct communication between the inlet and outlet ports when the following condition is satisfied:

$$P_2A_2 = P_1A_1 + S_1 + S_0$$

where
P$_1$ is the inlet pressure;
P$_2$ is the outlet pressure;
A$_2$ is the piston area;
A$_1$ is the area of the piston less the area of the piston rod;
S$_1$ is the force of the spring 5; and
S$_0$ is the force applied by the load sensing spring (not shown).

Turning now to the embodiment of the present invention shown in FIG. 3, those parts which correspond to parts of the valve shown in FIG. 1 are identified by the same reference numerals. The valve body 1 is mounted on a sprung part 7 of a vehicle and a position sensing device 8 of the valve assembly is connected to an unsprung part 9, of the vehicle, e.g. the rear axle, by means of an eye 24. The position sensing device 8 includes a lever 10 connected to the valve body by a pivot 12. The piston rod 2 extends through a hole in the lever 10 and has a stop 14 for abutment with the lever. A second stop 16 is located on the end of the piston rod and serves to support axially a cupped washer 18. A spring 20 is located between the lever 10 and the washer 18 and is in a nominal free position when the lever and washer abut their respective stops, as shown in FIG. 3. Connected to lever 10 adjacent its free end is a link rod 22 carrying the eye 24 for attaching the rod to the rear axle, or other convenient unsprung part of the vehicle. The rod 22 passes slidingly through a hole in lever 10 and has an end stop 26 for abutting the lever. A shoulder on the rod defines a further stop 28 for supporting a cupped washer 30, and spring 32 is located between the lever 10 and the washer 30, the spring being in nominal free position when the lever and washer abut their respective stops as illustrated.

For a nominal loading condition of the vehicle, and under static conditions, the sprung 7 and unsprung 9 parts of the vehicle will be at a specific nominal separation and the parts of the assembly will occupy the positions in which they have been shown in the drawings. Under these conditions there is no initial external force on the piston rod (S$_0$=0). The nominal loading which produces the specified nominal separation of the sprung and unsprung parts under static conditions is preferably a nominal driver only loading of the vehicle. If the vehicle were stationary, the cut-in pressure P$_C$ would be given by the equation:

$$P_CA_2 = P_CA_1 + S_1$$

or $$P_C = \frac{S_1}{A_2 - A_1}.$$

However, in the dynamic situation, there is a transfer of weight from the rear to the front wheels due to the deceleration of the vehicle as a consequence of which the sprung and unsprung parts of the vehicle move apart, whereby the link rod 22 pulls on the lever 10 causing it to pivot counterclockwise as seen in FIG. 3 to compress the spring 20. The force of the spring acts on the piston rod 2 via the washer 18 and stop 16 and is transmitted to the piston as a force −S$_0$ opposing the force of spring 5. Thus, in the dynamic situation, valve cut-in occurs at the pressure Pc when the following equation is satisfied:

$$P_CA_2 = P_CA_1 + S_1 - S_0$$

The point of cut-in is denoted by the letter A on FIG. 4. As the inlet pressure increases after cut-in, the outlet pressure will also continue to rise, but at a lower rate, as depicted by the line AB on FIG. 4, according to the relationship:

$$P_2A_2 = P_1A_1 + S_1 - S_0$$

or $$\frac{P_2}{P_1} = \frac{A_1}{A_2} + \frac{(S_1 - S_0)}{P_1A_2}$$

S$_1$ remains constant but as the deceleration increases the absolute value of S$_0$ increases whereby the effect of S$_1$ diminishes. The pressure characteristic follows the line AB and it will be seen that the line OAB for the driver only case is a good fit to the ideal curve X.

Considering now the other extreme of a fully laden vehicle, due to the sprung and unsprung parts being closer together the spring 32 is compressed and applies to the lever 10 a force which is transmitted to the piston rod 2 through the stop 14 as a force +S$_0$ which enhances the force S$_1$ exerted on the piston by the spring 5. With the weight transfer which occurs during deceleration the magnitude of S$_0$ falls as the sprung and unsprung parts move away from each other and spring 32 expands. The pressure at cut-in, denoted by the letter C in FIG. 4, occurs when the following equation is satisfied:

$$P_CA_2 = P_CA_1 + S_1 + S_0,$$

and above the cut-in pressure the outlet pressure will be determined by the equation:

$$P_2 = \frac{P_1A_1}{A_2} + \frac{S_1 + S_0}{A_2}$$

The pressure characteristic then follows the line CD in FIG. 4, from which it will be seen that the line OCD is a good fit to the ideal curve Y for the fully laden condition, as for the driver only condition.

While the valve of S$_0$ diminishes as a result of weight transfer during vehicle deceleration the outlet pressure always continues to increase as the inlet pressure rises.

From the foregoing it will be appreciated that for an intermediate vehicle loading condition, the spring 32 will initially be compressed partly, but due to the weight transfer phenomenon upon vehicle braking, the spring 32 may expand until the force it exerts on the piston rod falls to zero, and the spring 20 may then be compressed to apply to the piston rod a force in the opposite direction.

An additional spring 40 is shown in FIG. 3 located between lever 10 and washer 18 and arranged to increase the force exerted on the piston when the spring 20 has been compressed by a given amount. The effect of spring 40 is to reduce the rate of increase in the outlet pressure compared with that of the inlet pressure. Thus, for the driver only case, upon reaching pressure E at which the spring 40 is brought into play, the pressure characteristic would follow the line EF in FIG. 4, which may be desirable to obtain an even closer fit to the ideal curves.

It is also to be noted that the spring rates for the two springs 20,32 may be selected so that the lines AB and CB on the pressure characteristic are parallel. Alternatively, the rates of the springs can be arranged to provide different rates of increase after cut-in for the driver only and fully laden cases. Furthermore, these springs can have variable effective rates, or the rates can be varied by including extra springs, such as the spring 40. Thus, the assembly is more versatile in the preselection of the pressure characteristics. Another advantage is that with the springs 20,32 being nominally at free length the valve assembly can be fitted to an unladen vehicle without requiring any special adjustments.

In FIG. 5 there is shown a second load conscious valve assembly embodying the invention. It is basically similar to that of FIG. 3 and only the differences will be described. The lever carries a cage 50 housing the spring 32' which is received between a pair of washers 52,54. For a given nominal loading condition, e.g. the driver only condition, the washer 52 abuts against the lever 10 and a stop 56 on the link rod 22 while the washer 54 abuts the end of the cage 50 and a stop 58 on the rod 22. In response to an increase in vehicle loading the rod 22 becomes displaced to the left as seen in the drawing and spring 32' is compressed due to washer 54 being displace away from the end of cage 50, the spring then acting in exactly the same way as spring 32 in FIG. 3. When the loading decreases from the nominal value, spring 32' becomes compressed due to washer 52 being moved out of engagement with the lever 10 by stop 56, the spring force being transmitted to the lever through the cage 50. Thus, the spring 32' then functions in the same manner as spring 20 in FIG. 3, the force of the spring being applied to the piston rod through spring 40 and the end stop 16. The cage 50 includes a shoulder 60 and only if washer 52 comes into abutment with this shoulder is the spring 40' compressed to change the spring rate, in a similar way to the spring 40 in FIG. 3. In operation, the valve assembly of FIG. 5 performs in essentially the same way as that of FIG. 3 and the pressure characteristics for the two valves are therefore very similar as may be seen from a comparison of FIGS. 4 and 6. However, because FIG. 5 uses a single spring to apply forces in opposite directions to the piston, the gradients of the lines A'B' and C'D' on the pressure curves are necessarily very similar.

It will be understood that the spring 40' is not essential and is included only so that the outlet pressure will follow the line E'F'.

Two valve assemblies as disclosed herein can be used to advantage in a 'X'-split braking system in which diametrically opposite from and rear brakes are operated by the same circuit. When braking in a bend, the fluid pressure delivered to the inside rear wheel is reduced and that to the outside wheel is increased, whereby the tendency for the inside wheel to lock, as in the case of prior art valves, is averted.

I claim:

1. In a load conscious brake pressure reducing valve assembly comprising: a valve body (1) having an inlet (4) and an outlet (3); a valve (6) for controlling communication between the inlet (4) and the outlet (3); a piston (2A) mounted in the body for controlling the opening and closing of the valve (6), the piston (2A) being movable between a normal position in which the valve (6) is open to provide communication between the inlet (4) and the outlet (3) and a closed position in which the valve (6) is closed and said communication is interrupted; a piston rod (2) attached to the piston (2A) and protruding from the body; a bias spring (5) urging the piston (2A) with a predetermined force towards its normal position, the invention comprising a position sensing device (8) which senses the relative positions of the sprung (7) and unsprung (9) parts of a vehicle and includes force transmitting means (10) separately connected to said piston rod (2) separately from said bias spring, said force transmitting means (10) being constructed and arranged that in a first preselected nominal separation of the sprung part (7) relative to the unsprung part (9) the force transmitting means (10) applies substantially no force to said piston rod (2) so that substantially the only force exerted on said piston (2A) is said predetermined force of said bias spring (5), but when the distance between said parts (7,9) is greater than said nominal separation the force transmitting means (10) exerts a force on said piston rod (2) opposing the force exerted on said piston (2A) by said bias spring (5) and when the distance between said parts (7,9) is less than said nominal separation the force transmitting means (10) exerts a force on said piston rod (2) enhancing the force exerted on said piston by said bias spring (5).

2. In the load conscious brake pressure reducing valve assembly according to claim 1 wherein the predetermined nominal separation is that which exists under driver only loading static conditions.

3. In the load conscious brake pressure reducing valve assembly according to claim 1 or claim 2 wherein the position sensing device (8) includes: a first spring (32) acting on said force transmitting means to produce said enhancing force when the sprung (7) and unsprung (9) parts are spaced apart by less than the nominal separation; and a second spring (20) also acting on said force transmitting means to produce said opposing force when the sprung (7) and unsprung (9) parts are spaced apart by more than the nominal separation.

4. In the load conscious brake pressure reducing valve assembly according to claim 3 wherein a third spring (40) supplements the force exerted by the second spring (20) on said force transmitting means when the sprung (7) and unsprung (9) parts are spaced apart by more than a predetermined amount.

5. In the load conscious brake pressure reducing valve assembly according to claim 1 or claim 2 including a first spring (32') acting on said force transmitting means to produce said enhancing force when the sprung (7) and unsprung (9) parts are spaced apart by less than the nominal separation and also to produce said opposing force when the sprung (7) and unsprung (9) parts are spaced apart by more than the nominal separation.

6. In the load conscious brake pressure reducing valve assembly according to claim 5 including a second spring (40') acting on said force transmitting means (10) to supplement the opposing force produced by the first spring (32') when the sprung (7) and unsprung (9) parts are spaced apart by more than a predetermined amount.

7. In the load conscious brake pressure reducing valve assembly according to claim 3 wherein the force transmitting means is a lever (10) pivotally connected to the valve body, and the first spring (32 or 32') acts on the piston rod (2) via said lever (10).

8. In the load conscious brake pressure reducing valve assembly according to claim 4 wherein the springs (20,32,40,) are coil compression springs.

9. In the load conscious brake pressure reducing valve assembly according to claim 8 wherein the second spring (20) and the third spring (40) are coaxial with the piston rod (2).

* * * * *